United States Patent
Higashiyama

(10) Patent No.: US 12,351,725 B2
(45) Date of Patent: Jul. 8, 2025

(54) INK SET, WATER-BASED MAINTENANCE FLUID, CLEANING METHOD, IMAGE FORMING SYSTEM, AND IMAGE FORMING METHOD

(71) Applicant: BROTHER KOGYO KABUSHIKI KAISHA, Nagoya (JP)

(72) Inventor: Shunichi Higashiyama, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 167 days.

(21) Appl. No.: 18/368,804

(22) Filed: Sep. 15, 2023

(65) Prior Publication Data
US 2024/0101852 A1    Mar. 28, 2024

(30) Foreign Application Priority Data
Sep. 16, 2022    (JP) .................. 2022-148309

(51) Int. Cl.
  C09D 11/54    (2014.01)
  B41J 2/165    (2006.01)
  C09D 11/322   (2014.01)

(52) U.S. Cl.
  CPC ........... *C09D 11/54* (2013.01); *B41J 2/16552* (2013.01); *C09D 11/322* (2013.01); *B41J 2002/16558* (2013.01)

(58) Field of Classification Search
  CPC ..... C09D 11/54; C09D 11/322; C09D 11/107; C09D 11/38; C09D 11/40; B41J 2/16552; B41J 2002/16558
  See application file for complete search history.

(56) References Cited

U.S. PATENT DOCUMENTS

| | | |
|---|---|---|
| 5,609,671 A | 3/1997 | Nagasawa |
| 2008/0241398 A1 | 10/2008 | Kato et al. |
| | (Continued) | |

FOREIGN PATENT DOCUMENTS

| | | |
|---|---|---|
| EP | 2946929 A1 | 11/2015 |
| JP | S62-169876 A | 7/1987 |
| | (Continued) | |

OTHER PUBLICATIONS

Extended European Search Report issued Feb. 16, 2024 in corresponding European Patent Application No. 23197538.4, 7 pages.

*Primary Examiner* — Lisa Solomon
(74) *Attorney, Agent, or Firm* — Element IP, PLC

(57) ABSTRACT

An ink set includes a water-based ink and a water-based maintenance fluid. The water-based ink includes a colorant and at least one solvent whose SP value is 27.5 (MPa)$^{(1/2)}$ or higher in an amount of 30% by mass or more relative to a total mass of the solvents included in the water-based ink. The water-based maintenance fluid includes at least one solvent whose SP value is 25.0 (MPa)$^{(1/2)}$ or higher in an amount of 70% by mass or more relative to a total mass of the solvents included in the water-based maintenance fluid. A numerical value calculated by formula (1) is 1 or higher: a−b (1). a is a mass-weighted average of SP values (MPa)$^{(1/2)}$ of solvents included in the water-based ink, and b is a mass-weighted average of SP values (MPa)$^{(1/2)}$ of solvents included in the water-based maintenance fluid.

15 Claims, 1 Drawing Sheet

(56) References Cited

U.S. PATENT DOCUMENTS

| | | |
|---|---|---|
| 2010/0040782 A1 | 2/2010 | Arai et al. |
| 2014/0092168 A1 | 4/2014 | Ito et al. |
| 2015/0091973 A1* | 4/2015 | Ikoshi ................. B41J 2/01 523/205 |
| 2018/0148591 A1 | 5/2018 | Ozawa et al. |
| 2021/0198512 A1 | 7/2021 | Nakao et al. |
| 2022/0228014 A1 | 7/2022 | Takaori et al. |
| 2024/0059067 A1 | 2/2024 | Maeda et al. |

FOREIGN PATENT DOCUMENTS

| | | |
|---|---|---|
| JP | S62-169877 A | 7/1987 |
| JP | H01-148557 A | 6/1989 |
| JP | H08-3498 A | 1/1996 |
| JP | 2000513396 A | 10/2000 |
| JP | 2008524400 A | 7/2008 |
| JP | 2008246821 A | 10/2008 |
| JP | 2009515007 A | 4/2009 |
| JP | 2010064480 A | 3/2010 |
| JP | 2011515535 A | 5/2011 |
| JP | 2020196781 A | 12/2020 |
| JP | 2021107527 A | 7/2021 |
| JP | 06918263 B1 | 8/2021 |
| WO | WO-97048769 A1 | 12/1997 |
| WO | WO-2006066132 A2 | 6/2006 |
| WO | WO-2006066132 A3 | 6/2006 |
| WO | WO-2007053564 A2 | 5/2007 |
| WO | WO-2007053564 A3 | 5/2007 |
| WO | WO-2009117071 A1 | 9/2009 |
| WO | WO-2020241017 A1 | 12/2020 |

* cited by examiner

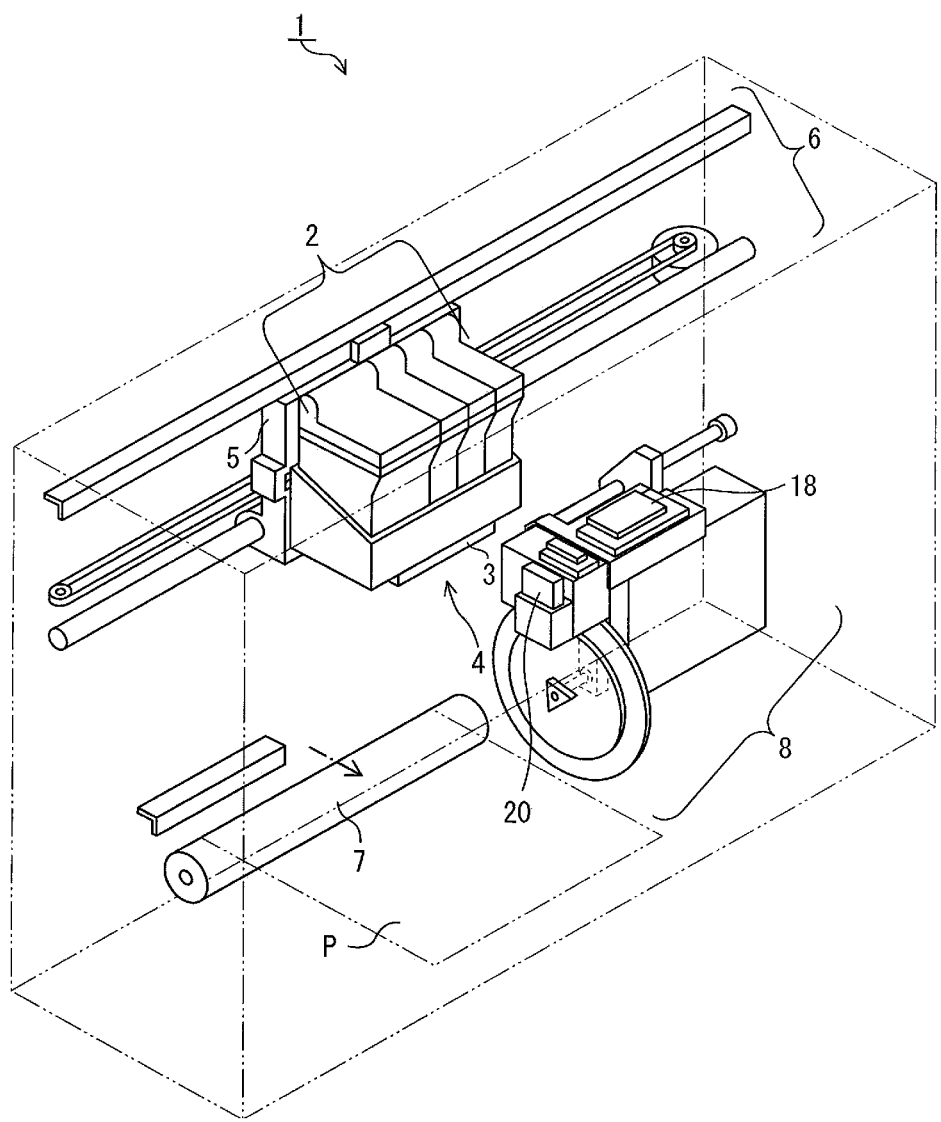

INK SET, WATER-BASED MAINTENANCE FLUID, CLEANING METHOD, IMAGE FORMING SYSTEM, AND IMAGE FORMING METHOD

REFERENCE TO RELATED APPLICATIONS

This application claims priority from Japanese Patent Application No. 2022-148309 filed on Sep. 16, 2022. The entire disclosure of the Japanese Patent Application is incorporated herein by reference.

BACKGROUND ART

The present disclosure relates to an ink set, a water-based maintenance fluid, a cleaning method, an image forming system, and an image forming method.

Various cleaning fluids for a discharge nozzle and ink channel of an inkjet recording device are proposed. For example, Japanese Unexamined Patent Application Publication No. S62-169876 (Patent Document 1) teaches a water-based maintenance fluid made of a polyhydric alcohol, a monohydric alcohol, and water; Japanese Unexamined Patent Application Publication No. S62-169877 (Patent Document 2) teaches a water-based maintenance fluid made of a lower alcohol, an anionic surfactant, and water; and Japanese Unexamined Patent Application Publication No. H01-148557 (Patent Document 3) teaches a water-based maintenance fluid made of a water-soluble chelating agent and water.

DESCRIPTION

According to an aspect of the present disclosure, an ink set includes a water-based ink and a water-based maintenance fluid. The water-based ink includes a colorant and at least one solvent whose SP value is 27.5 $(MPa)^{(1/2)}$ or higher in an amount of 30% by mass or more relative to a total mass of the solvents included in the water-based ink. The water-based maintenance fluid includes at least one solvent whose SP value is 25.0 $(MPa)^{(1/2)}$ or higher in an amount of 70% by mass or more relative to a total mass of the solvents included in the water-based maintenance fluid. A numerical value calculated by formula (1) is 1 or higher: a–b (1). a is a mass-weighted average of SP values $(MPa)^{(1/2)}$ of solvents included in the water-based ink, and b is a mass-weighted average of SP values $(MPa)^{(1/2)}$ of solvents included in the water-based maintenance fluid.

According to another aspect of the present disclosure, a water-based maintenance fluid includes at least one solvent whose SP value is 25.0 $(MPa)^{(1/2)}$ or higher in an amount of 70% by mass or more relative to a total mass of the solvents included in the water-based maintenance fluid. The water-based maintenance fluid is suitable for cleaning a water-based ink which includes a colorant and at least one solvent whose SP value is 27.5 $(MPa)^{(1/2)}$ or higher in an amount of 30% by mass or more relative to a total mass of the solvents included in the water-based ink. A numerical value calculated by formula (1) is 1 or higher: a–b (1). a is a mass-weighted average of SP values $(MPa)^{(1/2)}$ of solvents included in the water-based ink and b is a mass-weighted average of SP values $(MPa)^{(1/2)}$ of solvents included in the water-based maintenance fluid.

According to a further aspect of the present disclosure, a cleaning method includes applying a water-based maintenance fluid to a body to which a water-based ink is adhered. The water-based ink includes a colorant and at least one solvent whose SP value is 27.5 $(MPa)^{(1/2)}$ or higher in an amount of 30% by mass or more relative to a total mass of the solvents included in the water-based ink, and the water-based maintenance fluid includes at least one solvent whose SP value is 25.0 $(MPa)^{(1/2)}$ or higher in an amount of 70% by mass or more relative to a total mass of the solvents included in the water-based maintenance fluid. A numerical value calculated by formula (1) is 1 or higher: a–b (1). a is a mass-weighted average of SP values $(MPa)^{(1/2)}$ of solvents included in the water-based ink and b is a mass-weighted average of SP values $(MPa)^{(1/2)}$ of solvents included in the water-based maintenance fluid.

According to a further aspect of the present disclosure, an image forming system includes the above-described ink set; an ink channel through which the water-based ink in the ink set passes; an inkjet head connected to the ink channel and configured to apply the water-based ink of the ink set to an object on which an image is to be formed; and a cleaner configured to apply the water-based maintenance fluid of the ink set to the inkjet head to clean the inkjet head.

According to a further aspect of the present disclosure, an image forming method includes performing the above-described cleaning method; and applying the water-based ink to an object on which an image is to be formed to form an image on the object, before performing the cleaning method.

The FIGURE is a schematic view illustrating a configuration of one example of an inkjet recording device used in an image forming system of the present disclosure.

Embodiments of the present disclosure will now be described more fully hereinafter with reference to the accompanying drawing, in which some, but not all of the embodiments of the disclosure are shown.

Patent Documents 1 to 3 disclose what substances constitute the water-based maintenance fluid but do not disclose what substances constitute a water-based ink. That is, the documents do not disclose what combination of substances constituting a water-based ink and substances constituting the water-based maintenance fluid will exhibit more favorable cleanability and the like—in other words, a feature regarding an optimal combination (ink set) of water-based ink and water-based maintenance fluid.

An ink set of the present disclosure includes:
a water-based ink; and a water-based maintenance fluid; wherein
the water-based ink includes a colorant and a solvent group A, which includes or more types of solvents;
the solvent group A includes a solvent whose SP value is 27.5 $(MPa)^{(1/2)}$ or higher at 30% by mass or more relative to a total mass of the solvents included in the solvent group A;
the water-based maintenance fluid includes a solvent group B, which includes one or more types of solvents;
the solvent group B includes a solvent whose SP value is 25.0 $(MPa)^{(1/2)}$ or higher at 70% by mass or more relative to a total mass of the solvents included in the solvent group B; and a numerical value calculated by formula (1) below is 1 or higher.

$$a-b \qquad (1)$$

a: Mass-weighted average $(MPa)^{(1/2)}$ of SP values $(MPa)^{(1/2)}$ of solvents included in solvent group A b: Mass-weighted average $(MPa)^{(1/2)}$ of SP values $(MPa)^{(1/2)}$ of solvents included in solvent group B The water-based maintenance fluid of the present disclosure is for cleaning the water-based ink.

A cleaning method of the present disclosure includes:
a cleaning step of applying a water-based maintenance fluid to clean a body whereto a water-based ink is adhered; wherein
the water-based ink includes a colorant and a solvent group A, which includes one or more types of solvents;
the solvent group A includes a solvent whose SP value is 27.5 $(MPa)^{(1/2)}$ or higher at 30% by mass or more relative to a total mass of the solvents included in the solvent group A;
the water-based maintenance fluid includes a solvent group B, which includes one or more types of solvents;
the solvent group B includes a solvent whose SP value is 25.0 $(MPa)^{(1/2)}$ or higher at 70% by mass or more relative to a total mass of the solvents included in the solvent group B; and
a numerical value calculated by formula (1) below is 1 or higher.

$$a-b \qquad (1)$$

a: Mass-weighted average $(MPa)^{(1/2)}$ of SP values $(MPa)^{(1/2)}$ of solvents included in solvent group A
b: Mass-weighted average $(MPa)^{(1/2)}$ of SP values $(MPa)^{(1/2)}$ of solvents included in solvent group B An image forming system of the present disclosure includes:
an ink channel; ink applying means; and cleaning means; wherein
the water-based ink fed to the ink channel is applied by the ink applying means to an object whereon an image is to be formed, and
the water-based ink adhered to the ink applying means is cleaned by the cleaning means, which includes the water-based maintenance fluid.

An image forming method of the present disclosure includes:
an image forming step of using ink applying means to apply the water-based ink to an object whereon an image is to be formed; and
a cleaning step of using the water-based maintenance fluid to clean the water-based ink adhered to the ink applying means.

The ink set, water-based maintenance fluid, cleaning method, image forming system, and image forming method of the present disclosure are optimal for cleaning a body whereto a water-based ink is adhered.

In the present disclosure, "mass" may be replaced with "weight" unless indicated otherwise. For example, "mass ratio" may be replaced with "weight ratio" unless indicated otherwise, and "% by mass" may be replaced with "% by weight" unless indicated otherwise.

As referred to in the present disclosure, "solvent solubility parameter (SP value)" is a value expressed as the square root of the molecular aggregation energy and can be calculated by the method taught in R. F. Fedors, Polymer Engineering Science, 14, p. 147 (1967). The present disclosure adopts this numerical value. The unit of the SP value is "$(MPa)^{(1/2)}$". In the following description, the unit of the SP value may be omitted.

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed.

Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

<Ink Set>

First, an ink set of the present disclosure is described.
A water-based ink included in the ink set of the present disclosure includes a colorant. The colorant may include, for example, a pigment or a dye.

The pigment is not limited in particular. For example, carbon black, an inorganic pigment, and an organic pigment can be mentioned. As the carbon black, for example, furnace black, lamp black, acetylene black, and channel black can be mentioned. As the inorganic pigment, for example, titanium oxide, an iron oxide inorganic pigment, and a carbon-black inorganic pigment can be mentioned. As the organic pigment, for example, an azo pigment such as azo lake, an insoluble azo pigment, a condensed azo pigment, or a chelated azo pigment; a polycyclic pigment such as a phthalocyanine pigment, perylene and perinone pigments, an anthraquinone pigment, a quinacridone pigment, a dioxazine pigment, a thioindigo pigment, an isoindolinone pigment, or a quinophthalone pigment; a dye lake pigment such as a basic-dye lake pigment or an acidic-dye lake pigment; a nitro pigment; a nitroso pigment; and an aniline-black daylight fluorescent pigment can be mentioned. Another pigment can be used as long as it is dispersible in the aqueous phase. As specific examples of these pigments, for example, C.I. Pigment Black 1, 6, and 7; C.I. Pigment Yellow 1, 2, 3, 12, 13, 14, 15, 16, 17, 55, 74, 78, 150, 151, 154, 180, 185, and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C.I. Pigment Violet 19 and 196; C.I. Pigment Blue 1, 2, 3, 15, 15:1, 15:2, 15:3, 15:4, 16, 22, and 60; C.I. Pigment Green 7 and 36; and solid solutions of these pigments can also be mentioned.

The pigment may be dispersed in a solvating medium by a resin dispersant (also referred to as a resin-dispersed pigment). As the resin dispersant, for example, a general polymer dispersant (also referred to as a pigment-dispersing resin, resin dispersant, or the like) may be used. The resin dispersant may be prepared in-house. In the water-based ink of the present disclosure, the pigment may be encapsulated by a polymer. As the resin dispersant, for example, a resin dispersant including at least one among methacrylic acid and acrylic acid as a monomer can be used. For example, a commercially available product may be used. The resin dispersant may be, for example, a hydrophobic monomer such as styrene, a styrene derivative, vinylnaphthalene, a vinylnaphthalene derivative, or an aliphatic alcohol ester of α,β-ethylenically unsaturated carboxylic acid; a block copolymer, graft copolymer, or random copolymer made of two or more monomers selected from the group consisting of acrylic acid, an acrylic-acid derivative, maleic acid, a maleic-acid derivative, itaconic acid, an itaconic-acid derivative, fumaric acid, and a fumaric-acid derivative; or a salt of the above. As the commercially available product, for example, "Joncryl (registered trademark) 611", "Joncryl (registered trademark) 60", "Joncryl (registered trademark) 586", "Joncryl (registered trademark) 687", "Joncryl (registered trademark) 63", and "Joncryl (registered trademark) HPD296" made by Johnson Polymer; "Disperbyk 190" and "Disperbyk 191" made by BYK-Chemie; and "Solsperse 20000" and "Solsperse 27000" made by Zeneca can be mentioned.

As a method of dispersing the pigment using the pigment-dispersing resin, for example, dispersing the pigment by using a dispersing device can be mentioned. The dispersing device used to disperse the pigment is not particularly limited as long as it is a general disperser. However, for example, a ball mill, a roll mill, and a sand mill (for example, a high-speed sand mill) can be mentioned.

The pigment may be a self-dispersing pigment. The self-dispersing pigment has at least one among a carbonyl group, a hydroxyl group, a carboxylic-acid group, a sulfonic-acid group, a phosphoric-acid group, and other hydrophilic functional groups and salts thereof introduced into the pigment particles by chemical bonding, directly or via another group, and is thus dispersible in water even without the use of a dispersant. As the self-dispersing pigment, a pigment processed by the method taught in, for example, Japanese Unexamined Patent Application Publication H8-3498 (corresponding to EP 0688836), Japanese Unexamined Patent Application Publication 2000-513396 (translation of PCT application, corresponding to U.S. Pat. No. 5,837,045), Japanese Unexamined Patent Application Publication 2008-524400 (translation of PCT application, corresponding to US 2006/201380), Japanese Unexamined Patent Application Publication 2009-515007 (translation of PCT application, corresponding to US 2007/100023), or Japanese Unexamined Patent Application Publication 2011-515535 (translation of PCT application, corresponding to US 2009/229489) can be used. Note that the contents of these documents are incorporated herein by reference in their entireties. As a raw material of the self-dispersing pigment, any among an inorganic pigment and an organic pigment can be used. As a pigment suited for the processing, for example, a carbon black such as "MA8" or "MA100" made by Mitsubishi Chemical can be mentioned. As the self-dispersing pigment, for example, a commercially available product may be used. As the commercially available product, for example, "CAB-O-JET (registered trademark) 200", "CAB-O-JET (registered trademark) 250C", "CAB-O-JET (registered trademark) 260M", "CAB-O-JET (registered trademark) 270Y", "CAB-O-JET (registered trademark) 300", "CAB-O-JET (registered trademark) 400", "CAB-O-JET (registered trademark) 450C", "CAB-O-JET (registered trademark) 465M", and "CAB-O-JET (registered trademark) 470Y" made by Cabot Corporation; "BONJET (registered trademark) BLACK CW-2" and "BONJET (registered trademark) BLACK CW-3" made by Orient Chemical Industries; and "LIOJET (registered trademark) WD BLACK 002C" made by Toyo Ink Manufacturing can be mentioned.

A solid content of the pigment (pigment solid content) in a total amount of the water-based ink is not particularly limited and can be appropriately determined according to, for example, a desired optical density and chroma. The pigment solid content is, for example, 0.1% by mass to 20% by mass, 1% by mass to 15% by mass, or 2% by mass to 10% by mass.

The dye is not limited in particular. For example, a direct dye, an acidic dye, a basic dye, a reactive dye, and a food dye can be mentioned. As specific examples of the dye, a C.I. Direct Black, a C.I. Direct Blue, a C.I. Direct Red, a C.I. Direct Yellow, a C.I. Direct Orange, a C.I. Direct Violet, a C.I. Direct Brown, a C.I. Direct Green, a C.I. Acid Black, a C.I. Acid Blue, a C.I. Acid Red, a C.I. Acid Yellow, a C.I. Acid Orange, a C.I. Acid Violet, a C.I. Basic Black, a C.I. Basic Blue, a C.I. Basic Red, a C.I. Basic Violet, a C.I. Reactive Blue, a C.I. Reactive Red, a C.I. Reactive Yellow, a C.I. Food Black, a C.I. Food Red, a C.I. Food Yellow, and the like can be mentioned. As the C.I. Direct Black, for example, C.I. Direct Black 17, 19, 22, 31, 32, 51, 62, 71, 74, 108, 112, 113, 146, 154, 168, and 195 can be mentioned. As the C.I. Direct Blue, for example, C.I. Direct Blue 1, 6, 15, 22, 25, 41, 71, 76, 77, 80, 86, 90, 98, 106, 108, 120, 158, 163, 168, 199, and 226 can be mentioned. As the C.I. Direct Red, for example, C.I. Direct Red 1, 2, 4, 9, 11, 17, 20, 23, 24, 28, 31, 39, 46, 62, 75, 79, 80, 83, 89, 95, 197, 201, 218, 220, 224, 225, 226, 227, 228, 229, and 230 can be mentioned. As the C.I. Direct Yellow, for example, C.I. Direct Yellow 8, 11, 12, 24, 26, 27, 28, 33, 39, 44, 50, 58, 85, 86, 87, 88, 89, 98, 100, 110, 132, 142, and 173 can be mentioned. As the C.I. Direct Orange, for example, C.I. Direct Orange 34, 39, 44, 46, and 60 can be mentioned. As the C.I. Direct Violet, for example, C.I. Direct Violet 47 and 48 can be mentioned. As the C.I. Direct Brown, for example, C.I. Direct Brown 109 can be mentioned. As the C.I. Direct Green, for example, C.I. Direct Green 59 can be mentioned. As the C.I. Acid Black, for example, C.I. Acid Black 2, 7, 24, 26, 31, 48, 51, 52, 63, 110, 112, 115, 118, and 156 can be mentioned. As the C.I. Acid Blue, for example, C.I. Acid Blue 1, 7, 9, 15, 22, 23, 25, 29, 40, 43, 59, 62, 74, 78, 80, 90, 93, 100, 102, 104, 117, 120, 127, 138, 158, 161, 167, 220, and 234 can be mentioned. As the C.I. Acid Red, for example, C.I. Acid Red 1, 6, 8, 9, 13, 14, 18, 26, 27, 32, 35, 37, 42, 51, 52, 80, 83, 85, 87, 89, 92, 94, 106, 114, 115, 133, 134, 145, 158, 180, 198, 249, 256, 265, 289, 315, and 317 can be mentioned. As the C.I. Acid Yellow, for example, C.I. Acid Yellow 1, 3, 7, 11, 17, 23, 25, 29, 36, 38, 40, 42, 44, 61, 71, 76, 98, and 99 can be mentioned. As the C.I. Acid Orange, for example, C.I. Acid Orange 7 and 19 can be mentioned. As the C.I. Acid Violet, for example, C.I. Acid Violet 49 can be mentioned. As the C.I. Basic Black, for example, C.I. Basic Black 2 can be mentioned. As the C.I. Basic Blue, for example, C.I. Basic Blue 1, 3, 5, 7, 9, 24, 25, 26, 28, and 29 can be mentioned. As the C.I. Basic Red, for example, C.I. Basic Red 1, 2, 9, 12, 13, 14, and 37 can be mentioned. As the C.I. Basic Violet, for example, C.I. Basic Violet 7, 14, and 27 can be mentioned. As the C.I. Reactive Blue, for example, C.I. Reactive Blue 4, 5, 7, 13, 14, 15, 18, 19, 21, 26, 27, 29, 32, 38, 40, 44, and 100 can be mentioned. As the C.I. Reactive Red, for example, C.I. Reactive Red 7, 12, 13, 15, 17, 20, 23, 24, 31, 42, 45, 46, and 59 can be mentioned. As the C.I. Reactive Yellow, for example, C.I. Reactive Yellow 2, 3, 17, 25, 37, and 42 can be mentioned. As the C.I. Food Black, for example, C.I. Food Black 1 and 2 can be mentioned. As the C.I. Food Red, for example, C.I. Food Red 87, 92, and 94 can be mentioned. As the C.I. Food Yellow, for example, C.I. Food Yellow 3 can be mentioned.

One type of dye may be used alone, or two or more types may be used in combination. A content of the dye in the total amount of the water-based ink is, for example, 0.1% by mass to 20% by mass, 1% by mass to 15% by mass, or 2% by mass to 10% by mass.

The water-based ink may be a colored ink including the colorant or a colorless ink that does not include the colorant.

The solvent group A includes one or more types of solvents. For example, it may include two or more, three or more, four or more, or five or more types, and it may include 10 or fewer, nine or fewer, eight or fewer, seven or fewer, or six or fewer types.

The solvent group A includes a solvent whose SP value is 27.5 $(MPa)^{(1/2)}$ or higher at 30% by mass or more relative to a total mass of the solvents included in the solvent group A.

For example, this may be 40% by mass or more, 50% by mass or more, 60% by mass or more, 70% by mass or more, or 80% by mass or more. In testing, the inventor found that the more a water-based ink fluid contains a solvent whose SP value is relatively high, the lower a wettability relative to a nozzle face and head cap described below. This is because it can be inferred that the greater a concentration of a solvent whose SP value is relatively high, due to the increased SP value of the ink fluid, the lower the affinity between the water-based ink fluid and the nozzle face or head cap and the lower the wettability. Specifically, in terms of the solvent group A, when the water-based ink fluid includes a solvent whose SP value is 27.5 (MPa)$^{(1/2)}$ or higher at 30% by mass or more relative to the total mass of the solvents included in the solvent group A, in a situation in which, for example, the water-based ink is discharged by an inkjet head, the wettability of the water-based ink relative to the nozzle face of the head decreases. This provides favorable wiping of the water-based ink when the nozzle face is wiped.

The solvent group A may include a solvent whose SP value is 25.0 (MPa)$^{(1/2)}$ or higher at, for example, 70% by mass or more, 80% by mass or more, 90% by mass or more, or less than 100% by mass relative to the total mass of the solvents included in the solvent group A. At 70% by mass or more, as above, the greater the concentration of a solvent whose SP value is relatively high in the water-based ink fluid, the higher the SP value of the ink fluid, the lower the affinity between the water-based ink fluid and the nozzle face or head cap, and the lower the wettability. Therefore, at 70% by mass or more, when, for example, the water-based ink is discharged by the inkjet head, the wettability of the water-based ink relative to the nozzle face of the head decreases. This provides favorable wiping of the water-based ink when the nozzle face is wiped. A solvent whose SP value is 25.0 or more is, for example, selectable from the above, but the present invention is not limited thereto.

Representative solvents and their SP values (parenthetical numerical values) are given below. The solvent used in the present disclosure is, for example, selectable from below. However, the present invention is not limited thereto.

1,2-butanediol (30.3), 1,3-butanediol (30.3), 1,4-butanediol (30.7), 1,2-pentanediol (29.0), 1,5-pentanediol (29.0), 1,2-hexanediol (27.4), 1,6-hexanediol (27.7), 2-methyl-1,2-propanediol (30.0), 2-methyl-2,3-butanediol (28.1), 3-methyl-1,3-butanediol (28.4), 2-methyl-2,3-pentanediol (26.8), 3-methyl-1,5-pentanediol (27.4), propylene glycol (32.6), dipropylene glycol (27.2), tripropylene glycol (25.4), glycerin (41.1), diglycerin (37.6), ethylene glycol (36.6), diethylene glycol (30.7), triethylene glycol (27.9), diethylene glycol monomethyl ether (23.0), diethylene glycol monoethyl ether (22.4), diethylene glycol monobutyl ether (21.6), triethylene glycol monomethyl ether (22.2), triethylene glycol monoethyl ether (21.8), triethylene glycol monobutyl ether (21.2), dipropylene glycol monomethyl ether (DPM) (21.4), dipropylene glycol monobutyl ether (20.5), dipropylene glycol monopropyl ether (DPnP) (20.7), tripropylene glycol monomethyl ether (TPM) (20.5), tripropylene glycol monobutyl ether (TPnB) (20.5). One type of solvent may be used alone, or two or more types may be used in combination.

A content of the solvent group A in the total amount of the water-based ink is, for example, 10% by mass to 90% by mass, preferably 10% by mass to 50% by mass, and more preferably 20% by mass to 50% by mass.

The water-based ink may include, for example, polymer particles. The glass transition temperature (Tg) of the polymer particles is, for example, −60° C. to 150° C., 20° C. to 100° C., or 75° C. or lower. The polymer particles may, for example, be included in a polymer emulsion. The polymer emulsion is constituted by, for example, the polymer particles and a dispersion medium (for example, water). The polymer particles are not dissolved in the dispersion medium but rather are dispersed having a specific particle size.

As the polymer particles, for example, an acrylic-acid resin, a maleic-acid ester resin, a vinyl acetate resin, a carbonate resin, a polycarbonate resin, a styrene resin, an ethylene resin, a polyethylene resin, a propylene resin, a polypropylene resin, a urethane resin, a polyurethane resin, and copolymer resins thereof can be mentioned. One type of polymer particles may be used alone, or two or more types may be used in combination. Among these, an acrylic-acid resin is preferable.

As the polymer emulsion, for example, a commercially available product may be used. As the commercially available product, for example, "Mowinyl (registered trademark) 6969D" (Tg: 71° C.), "Mowinyl (registered trademark) 5450" (Tg: 53° C.), and "Mowinyl (registered trademark) DM772 (Tg: 22° C.) made by Japan Coating Resin; "Polysol (registered trademark) AP-3770" made by Showa Denko; and "Superflex (registered trademark) 150" (Tg: 40° C.) made by DKS can be mentioned.

An average particle size of the polymer particles is, for example, 5 nm to 500 nm, 20 nm to 300 nm, or 30 nm to 200 nm. The average particle size can be measured as an arithmetic-average diameter by using, for example, the dynamic light-scattering particle size distribution measurement device "LB-550" made by Horiba.

A content of the polymer particles in the total amount of the water-based ink is, for example, 0.1% by mass to 30% by mass, 0.5% by mass to 20% by mass, or 1% by mass to 10% by mass. One type of polymer particles may be used alone, or two or more types may be used in combination.

The water-based ink may, for example, further include a component such as water, a surfactant, a pH adjuster, a viscosity adjuster, a surface-tension adjuster, a fixing agent, an antiseptic, an antifungal agent, or a cross-linking agent.

The water is preferably ion-exchanged water or pure water. A content of the water in the total amount of the water-based ink is, for example, 10% by mass to 90% by mass and preferably 20% by mass to 80% by mass. The content of the water may be, for example, the remainder after the other components.

As the surfactant, for example, a nonionic surfactant can be mentioned. As the nonionic surfactant, for example, a commercially available product may be used. As the commercially available product, for example, "Olfine (registered trademark) E1004", "Olfine (registered trademark) E1006", and "Olfine (registered trademark) E1010" made by Nissin Chemical Industry can be mentioned.

A content of the nonionic surfactant in the total amount of the water-based ink is, for example, 0.1% by mass to 2% by mass, preferably 0.3% by mass to 1.5% by mass, and more preferably 0.5% by mass to 1% by mass.

The surfactant may further include a surfactant other than the nonionic surfactant (for example, an anionic surfactant, a cationic surfactant, or an amphoteric surfactant). However, a configuration may be adopted in which only the nonionic surfactant is used as the surfactant.

Next, a water-based maintenance fluid included in the ink set of the present disclosure is described.

A solvent group B included in the water-based maintenance fluid includes one or more types of solvents. For example, it may include two or more, three or more, four or more, or five or more types, and it may include 10 or fewer, nine or fewer, eight or fewer, seven or fewer, or six or fewer types.

The solvent group B includes a solvent whose SP value is 25.0 $(MPa)^{(1/2)}$ or higher at 70% by mass or more relative to a total mass of the solvents included in the solvent group B but may include such at, for example, 80% by mass or more, 90% by mass or more, or less than 100% by mass. If at 70% by mass or more, when, for example, the water-based ink is discharged by the inkjet head, the water-based ink adhered to the nozzle face and the like can be removed, and no droplets of the water-based maintenance fluid remain on the nozzle face. The solvent whose SP value is 25.0 or higher can be appropriately selected from among the solvents described with regard to the water-based ink.

A content of the solvent group B in a total amount of the water-based maintenance fluid is, for example, 10% by mass to 90% by mass, preferably 10% by mass to 50% by mass, and more preferably 20% by mass to 50% by mass.

The water-based maintenance fluid may, for example, further include a component such as water, a surfactant, a pH adjuster, a viscosity adjuster, a surface-tension adjuster, a fixing agent, an antiseptic, an antifungal agent, or a cross-linking agent. These components may, for example, be the same as those described with regard to the water-based ink.

In the ink set of the present disclosure, the numerical value calculated by formula (1) below is 1 or higher.

$$a-b \quad (1)$$

a: Mass-weighted average $(MPa)^{(1/2)}$ of SP values $(MPa)^{(1/2)}$ of solvents included in solvent group A
b: Mass-weighted average $(MPa)^{(1/2)}$ of SP values $(MPa)^{(1/2)}$ of solvents included in solvent group B The numerical value calculated by formula (1) may be, for example, 2 or higher or 3 or higher and may be 20 or lower, 15 or lower, 12 or lower, or 11 or lower. If 1 or higher, an overall evaluation result of mixability, wipeability, and cleanability described below is favorable. If 2 or higher, the overall evaluation result of mixability, wipeability, and cleanability is more favorable. Additionally, if 3 or higher, the evaluation result of mixability, wipeability, and cleanability is very favorable.

The water-based maintenance fluid can be used optimally in maintenance of an inkjet recording device using a water-based ink for inkjet recording (also "water-based ink" or "ink" hereinbelow) having favorable wettability with regard to a hydrophobic recording medium such as coated paper, plastic, a film, or an OHP sheet but is not limited thereto and can also be used in maintenance of an inkjet recording device using a water-based ink optimal for inkjet recording onto a recording medium other than a hydrophobic recording medium, such as normal paper, glossy paper, or matte paper. In the present disclosure, "coated paper" refers to normal paper whose main component is pulp, such as high-grade printing paper or medium-grade printing paper, coated with a coating for a purpose of improving smoothness, whiteness, glossiness, or the like. Specifically, high-grade coated paper, medium-grade coated paper, and the like can be mentioned.

The ink set of the present disclosure may, for example, further include a coagulant fluid. The coagulant fluid includes, for example, a coagulant that coagulates the colorant. From a viewpoint of, for example, the quality of an image to be formed, the coagulant is preferably at least one selected from a cationic polymer, an acidic compound, and a multivalent metal salt.

The cationic polymer may be a homopolymer or copolymer of a cationic monomer having, for example, a primary to tertiary amino group or a quaternary ammonium salt group as a cationic group. It may also be a copolymer of the cationic monomer and a non-cationic monomer. The cationic polymer can be used in any form among a water-soluble polymer and water-dispersible polymer particles.

As the cationic monomer, for example, trimethyl-p-vinylbenzylammonium chloride, trimethyl-p-vinylbenzylammonium bromide, N,N-dimethyl-N-ethyl-N-p-vinylbenzylammonium chloride, N,N,N-triethyl-N-2-(4-vinylphenyl)ethylammonium chloride, N,N-dimethylaminoethyl (meth)acrylate, and, and a quaternary compound of N,N-dimethylaminoethyl (meth)acrylamide formed using methyl chloride or methyl bromide, can be mentioned. Specifically, trimethyl-2-(methacryloyloxy)ethylammonium chloride, trimethyl-2-(methacryloyloxy)ethylammonium bromide, N,N-dimethyl-N-ethyl-2-(methacryloyloxy)ethylammonium chloride, and the like can be mentioned. As other copolymerizable monomers, N-vinylimidazole, N-vinyl-2-methylimidazole, and the like can also be mentioned. An allylamine derivative, a diallylethylamine derivative, or the like such as allylamine hydrochloride, allylamine acetate, or allylamine sulfate can also be used.

The non-cationic monomer is a monomer which does not include basic or cationic portion such as a primary to tertiary amino group, a salt thereof, or a quaternary ammonium salt group. For example, an acrylic-acid ester, a vinyl ester, and an olefin can be mentioned. Among these, methyl acrylate, ethyl acrylate, and methyl methacrylate are preferable. With the non-cationic monomer as well, one type may be used alone, or two or more types may be used in combination.

For example, from a viewpoint of effective flocculation, a content of the cationic polymer in the coagulant fluid is preferably 1 to 50% by mass and more preferably 5 to 30% by mass relative to a total mass of the coagulant fluid.

A coagulant fluid including the acidic compound can be configured using, for example, at least one acidic compound as the coagulant. As the acidic compound, for example, a compound having a phosphoric-acid group, a phosphonic-acid group, a phosphinic-acid group, a sulfuric-acid group, a sulfonic-acid group, a sulfinic-acid group, or a carboxyl group can be used. Alternatively, a salt of such a compound (for example, a multivalent metal salt) can be used. Among these, a compound having a carboxyl group is preferable. The compound is preferably selected from among, for example, polyacrylic acid, acetic acid, glycolic acid, malonic acid, malic acid, maleic acid, succinic acid, glutaric acid, fumaric acid, pyrrolidone carboxylic acid, derivatives of these compounds, and salts of such (for example, multivalent metal salts). For example, one type among these compounds may be used, or two or more types may be used in combination.

From a viewpoint of effective flocculation, a content of the acidic compound in the coagulant fluid is, for example, preferably 1 to 30% by mass and more preferably 3 to 20% by mass relative to the total mass of the coagulant fluid. From a viewpoint of flocculation speed, the pH (25° C.) of the coagulant fluid is, for example, preferably 1 to 6 and more preferably 3 to 5. In this situation, the pH (25° C.) of the ink fluid is, for example, preferably 7.5 or higher and more preferably 8 or higher.

As a coagulant fluid including the multivalent metal salt, for example, a salt of an alkaline earth metal in group 2 of the periodic table (for example, magnesium or calcium), a transition metal in group 3 of the periodic table (for example, lanthanum), a cation from group 13 of the periodic table (for example, aluminum), and a lanthanide (for example, neodymium) can be mentioned. As the salt, for example, a carboxylate (such as a formate, acetate, or benzoate), a nitrate, a chloride, or a thiocyanate is suitable. Among these, for example, a calcium salt or magnesium salt of a carboxylic acid (such as a formate, acetate, or benzoate), a calcium salt or magnesium salt of nitric acid, calcium chloride, and magnesium chloride are preferable.

From a viewpoint of effective flocculation, a content of the multivalent metal salt in the coagulant fluid is, for example, preferably 0.5 to 20% by mass and more preferably 1 to 10% by mass relative to the total mass of the coagulant fluid.

<Cleaning Method>

Next, a cleaning method of the present disclosure is described.

The cleaning method of the present disclosure includes a cleaning step of applying a water-based maintenance fluid to clean a body whereto a water-based ink is adhered. The water-based maintenance fluid includes a solvent group B including one or more types of solvents. Additionally, the water-based maintenance fluid is, for example, the water-based maintenance fluid as described in the ink set of the present disclosure above.

The water-based ink includes a solvent group A including a colorant and one or more types of solvents. Additionally, the water-based ink is, for example, the water-based ink as described in the ink set of the present disclosure above.

In the cleaning method of the present disclosure, the numerical value calculated by formula (1) below is 1 or higher.

$$a-b \quad (1)$$

a: Mass-weighted average $(MPa)^{(1/2)}$ of SP values $(MPa)^{(1/2)}$ of solvents included in solvent group A b: Mass-weighted average $(MPa)^{(1/2)}$ of SP values $(MPa)^{(1/2)}$ of solvents included in solvent group B. Additionally, for example, this is the formula (1) as described in the ink set of the present disclosure above.

As the body whereto the water-based ink is adhered, for example, a nozzle plate, a cap, and the like can be mentioned. The cap refers to a component that covers the nozzle plate to block the nozzle plate from outside air and prevents the ink from drying on the nozzle plate as a result of the nozzle plate being continued to be exposed to outside air.

The cleaning step may be, for example, a step of using a wiper (one type of an ink remover which is used for removing ink) to wipe away a mixture of the water-based ink and the water-based maintenance fluid after the water-based maintenance fluid is applied.

The cleaning step may be, for example, a step of using a pump (another type of the ink remover) to suction a mixture of the water-based ink and the water-based maintenance fluid after the water-based maintenance fluid is applied.

<Image Forming System, Image Forming Method>

Next, an image forming system and an image forming method of the present disclosure are described.

The image forming system of the present disclosure includes an ink channel, ink applying means, and cleaning means. The water-based ink fed to the ink channel is applied by the ink applying means to an object whereon an image is to be formed, and the water-based ink adhered to the ink applying means is cleaned by the cleaning means, which includes the water-based maintenance fluid.

The image forming system of the present disclosure may, for example, combine an inkjet recording device provided with the ink applying means and a cleaning device provided with the cleaning means. Alternatively, it may be a single device provided with the ink applying means and the cleaning means.

The FIGURE illustrates a configuration of one example of the inkjet recording device. As illustrated, this inkjet recording device 1 includes four ink containers (ink cartridges 2), an ink discharge portion (inkjet head) 3, a head unit 4, a carriage 5, a drive unit 6, a platen roller 7, and a purge device 8 as the main components.

Each of the four ink cartridges 2 includes one of four colors of water-based inks: yellow, magenta, cyan, black. For example, at least one of the four colors of water-based inks is the water-based ink of the present disclosure. The present example illustrates a set of four ink cartridges 2. However, instead, an integrated ink cartridge whose interior is partitioned to form a water-based yellow ink storage portion, a water-based magenta ink storage portion, a water-based cyan ink storage portion, and a water-based black ink storage portion may be used. As a main body of the ink cartridge, for example, one that is conventionally known can be used.

The inkjet head 3, which is disposed in the head unit 4, records on a recording medium (for example, recording paper) P. The four ink cartridges 2 and the head unit 4 are mounted on the carriage 5. The drive unit 6 causes the carriage 5 to undergo reciprocating movement in a linear direction. As the drive unit 6, for example, one that is conventionally known can be used (for example, see Japanese Unexamined Patent Application Publication 2008-246821 (corresponding to US 2008/241398); the contents of these documents are incorporated herein by reference in their entireties.) The platen roller 7 extends in the direction in which the carriage 5 reciprocates and is disposed opposing the inkjet head 3.

The inkjet head 3 is configured by, for example, layering a plurality of thin metal plates. A through hole is formed in each thin plate. Layering the plurality of thin plates having the through hole formed therein forms a channel where through the water-based ink is passed. The thin plates are, for example, adhered to each other by an adhesive.

The purge device 8 suctions defective ink including, for example, air bubbles that accumulate inside the inkjet head 3. As the purge device 8, for example, one that is conventionally known can be used (for example, see Japanese Unexamined Patent Application Publication 2008-246821).

On a platen-roller 7 side of the purge device 8, a wiper member 20 is disposed adjacent to the purge device 8. The wiper member 20 is formed in a paddle shape and wipes a nozzle-forming face of the inkjet head 3 in conjunction with movement of the carriage 5. In the FIGURE, a cap 18 covers a plurality of nozzles of the inkjet head 3 returned to a reset position when recording is ended to prevent drying of the water-based ink.

In the inkjet recording device 1 of the present example, the four ink cartridges 2 are, together with the head unit 4, mounted to one carriage 5. However, the present invention is not limited thereto. In the inkjet recording device 1, each of the four ink cartridges 2 may be mounted to a carriage separate from that of the head unit 4. Each of the four ink cartridges 2 may be disposed and fixed in the inkjet recording device 1 instead of being mounted to the carriage 5. In these embodiments, for example, each of the four ink cartridges 2 and the head unit 4 mounted to the carriage 5 are linked by a tube or the like, and the water-based ink is fed from each of the four ink cartridges 2 to the head unit 4. In these embodiments, four ink bottles of a bottle shape may be used instead of the four ink cartridges 2. In this situation, it is preferable for the ink bottle to be provided with an inlet for pouring the ink into the bottle from the outside.

Inkjet recording using this inkjet recording device 1 is implemented, for example, as follows. First, the recording paper P is fed from a paper cassette (not illustrated) provided to the side of or below the inkjet recording device 1. The recording paper P is introduced to between the inkjet head 3 and the platen roller 7. Predetermined recording is performed by the water-based ink discharged from the inkjet head 3 on the introduced recording paper P. This discharging may, for example, be performed at a first discharge amount as above or, when a specific condition is met, be performed at a second discharge amount. Upon recording being performed thereon, the recording paper P is ejected from the inkjet recording device 1. In the FIGURE, illustration of a feeding mechanism and ejecting mechanism for the recording paper P is omitted.

The device illustrated in the FIGURE adopts a serial inkjet head, but the present invention is not limited thereto. The inkjet recording device may be a device that adopts a line-type inkjet head or roll-to-roll. The serial inkjet head is an inkjet head that prints while the inkjet head reciprocates in a width direction of the object whereon the image is to be formed. A line-type inkjet head is an inkjet head that covers the entire width direction of the object whereon the image is to be formed. Roll-to-roll is a method of letting out a roll-shaped object whereon the image is to be formed, printing thereon, and again winding this into a roll shape.

The cleaning means feeds the water-based maintenance fluid to the inkjet head 3, the wiper, the tube, and the like and cleans such (not illustrated). The cleaning-fluid feeding means (i.e., applicator) may be any means as long as it can feed the cleaning fluid to the inkjet head 3, the wiper, the tube, and the like. As the cleaning-fluid feeding means or the applicator, those described in U.S. Pat. No. 6,342,105 B1 (corresponding to JP H11-157087 A), U.S. Pat. No. 6,460,967 B1 (corresponding to JP H11-334095 A), U.S. Pat. No. 8,240,809 B2 (corresponding to JP 2007-331116 A), US 2023/0150266 A1 (corresponding to JP 2023-073911 A), and US 2022/0314626 A1 (corresponding to JP 2022-157650 A) can be used. The contents of these documents are incorporated herein by reference in their entirety.

The cleaning means (i.e., cleaner) is described specifically. The cleaning means, with the applicator, applies the maintenance fluid around the head, the ink channel, and the like (also referred to as the head and the like hereinbelow) to, for example, remove material, originating from the ink fluid, stuck to the nozzle face of the head from the nozzle face of the head. The stuck ink material, originating from the ink fluid, on the nozzle face becomes easier to remove by being dissolved, swollen, or the like by the applied maintenance fluid.

The sticking originating from the ink fluid may be removed by, for example, scraping using a blade or wiping using a cloth or paper before or after applying the maintenance fluid. A method of, after applying the maintenance fluid, using a wiper blade to scour (wipe) the nozzle face and scraping off the stuck material originating from the ink fluid and a solid, originating from fine floating matter suspended in air, adhered to the nozzle face; a method of using, for example, wind pressure or hydraulic pressure from the maintenance fluid or the like; or a method of wiping using a cloth or paper is preferable. The above-described wiper blade, scraper, fluid pressure, and wiping cloth or paper are all examples of the ink remover. Among these, scraping using a blade is preferable.

The material of the wiper blade is, for example, preferably a rubber having elasticity. As a specific material, butyl rubber, chloroprene rubber, ethylene propylene rubber, silicone rubber, urethane rubber, nitrile rubber, and the like can be mentioned. To impart ink repellency to the wiper blade, a wiper blade coated with a fluororesin or the like may be used.

According to the present disclosure, a stuck ink material originating from the water-based ink on the nozzle face can be easily scraped off.

Characteristic features of the image forming method of the present disclosure are: including the image forming step of using the ink applying means to apply the water-based ink above to the object whereon the image is to be formed and the cleaning step of using the water-based maintenance fluid above to clean the water-based ink adhered to the ink applying means; using the ink set of the present disclosure.

The image forming step can be implemented using, for example, the inkjet recording device illustrated in the FIGURE. The cleaning step can be implemented by, for example, the cleaning means.

In the image forming method of the present disclosure, when using the coagulant fluid, for example, applying the water-based ink after applying the coagulant fluid is preferable. That is, a step form of applying the coagulant fluid onto the recording medium, in advance, for flocculating the colorant included in the water-based ink before applying the water-based ink, and applying the water-based ink so as to contact the coagulant fluid applied onto the recording medium, and forming the image is preferable. This can speed up inkjet recording and provide a high-density and high-resolution image despite high-speed recording.

The image forming method of the present disclosure may be, for example, a method provided with a step of applying the coagulant fluid and a step of applying the water-based ink onto an intermediate transfer body by using the intermediate transfer body as a recording medium whereon the image is first recorded and a transfer step of, after forming the image on the intermediate transfer body, transferring the image formed on the intermediate transfer body to a desired, final recording medium. In this situation as well, an embodiment of providing the step of applying the water-based ink after applying the coagulant fluid at the step of applying the coagulant fluid is preferable.

The image forming method of the present disclosure may have, for example, a drying step of heating an upper face of the recording medium or intermediate transfer body after the step of applying the coagulant fluid and the step of applying the ink to fix the image. The drying step is not restricted in particular other than needing to evaporate and remove the solvating media (water and solvents) included in the coagulant fluid and water-based ink applied to the recording medium or intermediate transfer body. Hot air, a heated platen, a heated press, or the like can be selected as appropriate according to the purpose. In the image forming method using the intermediate transfer body, the drying step may be provided, for example, after the transfer step of transferring the image formed on the intermediate transfer body to the desired, final recording medium.

When polymer particles are included in the water-based ink, to increase the water resistance, weather resistance, abrasion resistance, and the like of the image, it is also possible to select, for example, a drying step whose purpose is to soften the polymer particles into a film.

EXAMPLES

Next, Examples of the present disclosure are described together with Comparative Examples. The present invention is not limited or restricted by the following Examples and Comparative Examples. In the following description, "part" and "%" are based on mass unless indicated otherwise. Each physical property was measured according to the measurement methods below.

[Preparation of Resin Dispersant]

In a flask provided with a dropping funnel, a cooler, and a stirrer, 135 g of Terathane (registered trademark) 650 (polyether diol made by Invista (Wichita, KS)), 54 g of 2,2'-dimethylolpropanoic acid (DMPA), 132 g of sulfolane, and 0.06 g of dibutyltin dilaurate (DBTDL) were added in a nitrogen atmosphere. This was heated to 60° C. while mixing and then mixed further. To this mixture, 164 g of m-tetramethylenexylylene diisocyanate (TMXDI) was added using the dropping funnel. Residual TMXDI in the dropping funnel was rinsed into the flask using 15 g of sulfolane. The temperature was raised to 100° C. and maintained at 100° C. until the isocyanate content reached 1.3% by mass or less. Next, the temperature was lowered to 60° C., and 12.9 g of diethanolamine (DEA) was added over a period of 5 minutes using the dropping funnel. The temperature was maintained at 60° C. until residual DEA in the dropping funnel was rinsed into the flask using 5 g of sulfolane. After holding the temperature at 60° C. for 1 hour, 376 g of an aqueous solution containing potassium hydroxide at 3% by mass was added over a period of 10 minutes using the dropping funnel. 570 g of deionized water was also added. Afterward, the temperature was maintained at 60° C. for 1 hour and cooled to room temperature to obtain a resin dispersant of a solid content of 24% by mass.

[Preparation of Black Pigment Dispersion]

The resin dispersant was neutralized using potassium hydroxide or an amine to increase solubility in water and facilitate dissolving in water. Next, using a high-pressure compressed air microfluidizer (model M-110Y, made by Microfluidics of Newton (Massachusetts)), a mixture in which a content of carbon black is approximately 27% by mass and a mass ratio between the content (P) of the carbon black and a content (D) of the resin dispersant is P:D=120:39 was produced. Afterward, for optimal medium milling conditions, deionized water was added to make the content of the carbon black approximately 24% by mass, and crushing was performed for 4 hours. After the crushing, deionized water was added, and this was mixed thoroughly. Next, upon filtering and removing impurities, the content of the carbon black was made to be 15% by mass by diluting using deionized water, thereby obtaining a black pigment dispersion.

[Preparation of Magenta Pigment Dispersion]

A magenta pigment dispersion was obtained in the same manner as preparing the black pigment dispersion other than using an Eiger mini mill (Model M250, VSE EXP, made by Eiger Machinery Inc. (Chicago, Illinois)) instead of the high-pressure compressed air microfluidizer, using a quinacridone pigment instead of carbon black, and making a mass ratio between a content (P) of the quinacridone pigment and the content (D) of the resin dispersant be P:D=120:28.

[Preparation of Cyan Pigment Dispersion]

A cyan pigment dispersion was obtained in the same manner as preparing the black pigment dispersion other than using an Eiger mini mill (Model M250, VSE EXP, made by Eiger Machinery Inc. (Chicago, Illinois)) instead of the high-pressure compressed air microfluidizer, using a phthalocyanine pigment instead of carbon black, and making a mass ratio between a content (P) of the phthalocyanine pigment and the content (D) of the resin dispersant be P:D=120:32.

[Preparation of Water-Based Inks 1 to 3]

The components in table 1 other than the acrylic resin emulsion and the black pigment dispersion were uniformly mixed to obtain an ink solvating medium. As the surfactant, "Olfine (registered trademark) E1010" made by Nissin Chemical Industry was used. As the aqueous solution of an antiseptic, "Proxel (registered trademark) GXL" (antiseptic concentration of 20 wt %) sold by Arxada Japan was used. Next, as the acrylic resin emulsion, "Mowinyl (registered trademark) 6969D" made by Japan Coating Resin was added to the ink solvating medium, and this was uniformly mixed. Afterward, the black pigment dispersion was added to the ink solvating medium into which the acrylic resin emulsion was mixed, and this was uniformly mixed. Afterward, the obtained mixture was filtered using a cellulose acetate-type membrane filter (pore size of 3.00 m) made by Toyo Roshi Kaisha to obtain the water-based inks 1 to 3 given in Table 1.

[Preparation of Water-Based Inks 4, 6]

Water-based inks 4 and 6 were obtained in the same manner as the preparation of water-based ink 1 other than using the cyan pigment dispersion instead of the black pigment dispersion.

[Preparation of Water-Based Ink 5]

Water-based ink 5 was obtained in the same manner as the preparation of water-based ink 1 other than using the magenta pigment dispersion instead of the black pigment dispersion.

[Preparation of Water-Based Maintenance Fluids 1 to 9]

All the components in table 2 were uniformly mixed to obtain the water-based maintenance fluid. As the surfactant, "Olfine (registered trademark) E1010" made by Nissin Chemical Industry was used. As the aqueous solution of an antiseptic, "Proxel (registered trademark) GXL" (antiseptic concentration of 20 wt %) sold by Arxada Japan was used. Afterward, the obtained mixture was filtered using a cellulose acetate-type membrane filter (pore size of 3.00 m) made by Toyo Roshi Kaisha to obtain the water-based maintenance fluids 1 to 9 given in Table 2.

TABLE 1

| | | SP value | Water-based ink | | | | | |
| --- | --- | --- | --- | --- | --- | --- | --- | --- |
| | Composition | | 1 | 2 | 3 | 4 | 5 | 6 |
| Colorant | Black pigment dispersion (*1) | | 13.33% | 13.33% | 25.33% | | | |
| | Magenta pigment dispersion (*2) | | | | | | 20.00% | |
| | Cyan pigment dispersion (*3) | | | | | 8.00% | | 8.00% |
| Fixing resin | Aqueous solution of acrylic resin emulsion (*4) | | 16.67% | 16.67% | 11.90% | 7.14% | 14.29% | 7.14% |
| Solvent | Glycerin (GLY) | 41.1 | | 20.00% | | | | |

TABLE 1-continued

| | Composition | SP value | Water-based ink 1 | 2 | 3 | 4 | 5 | 6 |
|---|---|---|---|---|---|---|---|---|
| | Propylene glycol (PG) | 32.6 | 23.00% | 5.00% | 30.00% | 4.00% | | 3.00% |
| | 1.3-Butanediol | 30.3 | | | | 4.00% | 10.00% | 3.00% |
| | 1,2-Hexanediol | 27.4 | | | | 10.00% | | 5.00% |
| | 3-Methyl-1,5-pentanediol (MPD) | 27.4 | | | | | | |
| | Tripropylene glycol (TPG) | 25.4 | 4.00% | 4.00% | 20.00% | 5.00% | 10.00% | 4.00% |
| | Triethylene glycol monobutyl ether (TEGnBE) | 21.2 | | | | | 5.00% | 4.00% |
| | Tripropylene glycol monomethyl ether (TPGME) | 20.5 | | | | | | 4.00% |
| Surfactant | Olfine ® E1010 (*5) | | 0.50% | 0.50% | 0.50% | 0.50% | 0.30% | 0.50% |
| Aqueous solution of antiseptic | Proxel ® GXL (*6) | | 0.25% | 0.25% | 0.25% | 0.25% | 0.25% | 0.25% |
| | Pure water | | 42.25% | 40.25% | 12.02% | 61.11% | 40.16% | 61.11% |
| | Total | | 100.00% | 100.00% | 100.00% | 100.00% | 100.00% | 100.00% |
| | SP value mass-weighted average | | 31.53 | 37.47 | 29.72 | 28.37 | 26.52 | 25.83 |
| | Ratio of solvent of SP value of 27.5 or higher | | 85.19% | 86.21% | 60.00% | 34.78% | 40.00% | 26.09% |
| | Ratio of solvent of SP value of 25.0 or higher | | 100.00% | 100.00% | 100.00% | 100.00% | 80.00% | 65.22% |

(*1): Pigment concentration 15 wt %, dispersing resin 4.875 wt %
(*2): Pigment concentration 15 wt %, dispersing resin 3.5 wt %
(*3): Pigment concentration 15 wt %, dispersing resin 3.75 wt %
(*4): Acrylic-resin concentration 42 wt %
(*5): Nonionic surfactant (acetylene glycol surfactant; made by Nissin Chemical Industry; surfactant concentration 100 wt %)
(*6): Sold by Arxada Japan; antiseptic concentration 20 wt %

TABLE 2

| | Composition | SP value | Water-based maintenance fluid 1 | 2 | 3 | 4 | 5 |
|---|---|---|---|---|---|---|---|
| Colorant | Black pigment dispersion (*1) | | | | | | |
| | Magenta pigment dispersion (*2) | | | | | | |
| | Cyan pigment dispersion (*3) | | | | | | |
| Fixing resin | Aqueous solution of acrylic resin emulsion (*4) | | | | | | |
| Solvent | Glycerin (GLY) | 41.1 | | | | 8.00% | 9.00% |
| | Propylene glycol (PG) | 32.6 | 1.00% | 10.00% | 11.00% | | |
| | 1.3-Butanediol | 30.3 | | | | 4.00% | 6.00% |
| | 1,2-Hexanediol | 27.4 | | | | | |
| | 3-Methyl-1,5-pentanediol (MPD) | 27.4 | 18.00% | 9.00% | 8.00% | 4.00% | 2.00% |
| | Tripropylene glycol (TPG) | 25.4 | 3.00% | 3.00% | 3.00% | | |
| | Triethylene glycol monobutyl ether (TEGnBE) | 21.2 | | | | | |
| | Tripropylene glycol monomethyl ether (TPGME) | 20.5 | | | | | |
| Surfactant | Olfine ® E1010 (*5) | | 0.50% | 0.50% | 0.50% | 0.50% | 0.50% |
| Aqueous solution of antiseptic | Proxel ® GXL (*6) | | 0.25% | 0.25% | 0.25% | 0.25% | 0.25% |
| | Pure water | | 77.25% | 77.25% | 77.25% | 83.25% | 82.25% |
| | Total | | 100.00% | 100.00% | 100.00% | 100.00% | 100.00% |
| | SP value mass-weighted average | | 27.36 | 29.49 | 29.73 | 34.98 | 35.68 |
| | Ratio of solvent of SP value of 27.5 or higher | | 4.55% | 45.45% | 50.00% | 75.00% | 88.24% |
| | Ratio of solvent of SP value of 25.0 or higher | | 100.00% | 100.00% | 100.00% | 100.00% | 100.00% |

| | Composition | SP value | Water-based maintenance fluid 6 | 7 | 8 | 9 |
|---|---|---|---|---|---|---|
| Colorant | Black pigment dispersion (*1) | | | | | |
| | Magenta pigment dispersion (*2) | | | | | |
| | Cyan pigment dispersion (*3) | | | | | |

TABLE 2-continued

| | | | | | | |
|---|---|---|---|---|---|---|
| Fixing resin | Aqueous solution of acrylic resin emulsion (*4) | | | | | |
| Solvent | Glycerin (GLY) | 41.1 | | | | |
| | Propylene glycol (PG) | 32.6 | 2.00% | | | |
| | 1.3-Butanediol | 30.3 | 4.00% | | | |
| | 1,2-Hexanediol | 27.4 | | 5.00% | | |
| | 3-Methyl-1,5-pentanediol (MPD) | 27.4 | | | 2.00% | 2.00% |
| | Tripropylene glycol (TPG) | 25.4 | 23.00% | 40.00% | 8.00% | 8.00% |
| | Triethylene glycol monobutyl ether (TEGnBE) | 21.2 | | | | 3.00% |
| | Tripropylene glycol monomethyl ether (TPGME) | 20.5 | | | 4.00% | 3.00% |
| Surfactant | Olfine ® E1010 (*5) | | 0.50% | 0.50% | 0.30% | 0.30% |
| Aqueous solution of antiseptic | Proxel ® GXL (*6) | | 0.25% | 0.25% | 0.25% | 0.25% |
| | Pure water | | 70.25% | 54.25% | 85.45% | 83.45% |
| | Total | | 100.00% | 100.00% | 100.00% | 100.00% |
| | SP value mass-weighted average | | 26.57 | 25.62 | 24.29 | 23.94 |
| | Ratio of solvent of SP value of 27.5 or higher | | 20.69% | 0.00% | 0.00% | 0.00% |
| | Ratio of solvent of SP value of 25.0 or higher | | 100.00% | 100.00% | 71.43% | 62.50% |

(*1): Pigment concentration 15 wt %, dispersing resin 4.875 wt %
(*2): Pigment concentration 15 wt %, dispersing resin 3.5 wt %
(*3): Pigment concentration 15 wt %, dispersing resin 3.75 wt %
(*4): Acrylic-resin concentration 42 wt %
(*5): Nonionic surfactant (acetylene glycol surfactant; made by Nissin Chemical Industry; surfactant concentration 100 wt %)
(*6): Sold by Arxada Japan; antiseptic concentration 20 wt %

Examples 1 to 11 and Comparative Examples 1 to 3

Results of cleaning the prepared water-based inks 1 to 6 using water-based maintenance fluids 1 to 9 are as in Examples 1 to 11 and Comparative Examples 1 to 3 given in Table 3.

Results of (a) a mixability evaluation, (b) a wipeability evaluation, and (c) a cleanability evaluation were implemented by the following methods for the cleaning fluids of Examples 1 to 11 and Comparative Examples 1 to 3.

(a) Mixability Evaluation

The water-based maintenance fluid was placed in a petri dish to a fluid depth of about 1 mm. Using a dropper, one drop of the water-based ink was dropped in the center, and the spreading of the ink was observed. In the following evaluation criteria, "speed" refers to a diffusion speed of the water-based maintenance fluid and not a time from dropping to the start of diffusion.

[Evaluation Criteria for Mixability Evaluation]
AA: Water-based ink beginning to spread into water-based maintenance fluid able to be confirmed immediately after dropping
A: Water-based ink beginning to spread into water-based maintenance fluid able to be confirmed immediately after dropping but at slower speed than AA
B: Water-based ink beginning to spread into water-based maintenance fluid able to be confirmed immediately after dropping but at even slower speed than A
C: No change able to be confirmed immediately after dropping, but slight spreading of water-based ink into water-based maintenance fluid able to be confirmed after 1 minute (b) Wipeability Evaluation The ink was discharged continuously from the head for 40 minutes. The nozzle face of the head whereto, for example, a satellite of the water-based ink is adhered was wiped using a wiper made of rubber whereto the water-based maintenance fluid is adhered. The wiping away of the water-based ink was observed.

[Evaluation Criteria for Wipeability Evaluation]
AA: Water-based ink adhered to nozzle face able to be removed in one or two wipes
A: Water-based ink adhered to nozzle face able to be removed in three or four wipes
B: Water-based ink adhered to nozzle face able to be removed in five or six wipes
C: Seven or more wipes required to cleanly remove water-based ink adhered to nozzle face (c) Cleanability Evaluation Cleanability was evaluated by considering cleaning, by using the water-based maintenance fluid, of water-based ink that is entered into the head cap by purging or the like and dried. First, one drop (approximately 0.05 mL) of the water-based ink was dropped onto a glass slide using a dropper. Afterward, this glass slide was placed in a 40° C. oven for 30 minutes. After returning this to room temperature, the slide was placed at an incline of approximately 100 from horizontal, and the water-based maintenance fluid was dropped on the ink drop that had dried to a greater extent. The water-based maintenance fluid was dropped successively at 1-second intervals using a dropper (approximately 0.05 mL per drop), and the running off of the water-based ink at this time was observed. Note that the same type of dropper as that used to drop the water-based ink was used to drop the water-based maintenance fluid. In each situation, an unused dropper was used.

[Evaluation Criteria for Cleanability Evaluation]
AA: Water-based ink ran off starting from first drop, water-based ink completely removed after 20 to 30 drops
A: Running off of water-based ink less favorable than AA, but water-based ink ran off starting from first drop, and water-based ink completely removed after 30 to 60 drops
B: Running off of water-based ink less favorable than A, but water-based ink ran off starting from second to third drop, and water-based ink completely removed after 60 to 120 drops
C: Running off of water-based ink less favorable than B. Hardly any change able to be confirmed until third drop. Water-based ink ran off at subsequent drops but required 120 or more drops for ink to be completely removed The worst result among the three evaluation results above (AA, A, B, C) was made to be the overall evaluation result.

TABLE 3

|  | Water-based ink | Water-based maintenance fluid | a−b | Mixability | Wipeability | Cleanability | Overall evaluation |
|---|---|---|---|---|---|---|---|
| Example 1 | 1 | 1 | 4.17 | AA | AA | AA | AA |
| Example 2 | 1 | 2 | 2.04 | A | AA | A | A |
| Example 3 | 1 | 3 | 1.81 | A | AA | B | B |
| Example 4 | 2 | 1 | 10.11 | AA | AA | AA | AA |
| Example 5 | 2 | 4 | 2.49 | A | AA | A | A |
| Example 6 | 2 | 5 | 1.79 | A | AA | B | B |
| Example 7 | 3 | 1 | 2.36 | A | AA | A | A |
| Example 8 | 3 | 6 | 3.15 | AA | AA | AA | AA |
| Example 9 | 4 | 6 | 1.80 | A | AA | B | B |
| Example 10 | 4 | 7 | 2.75 | A | AA | A | A |
| Example 11 | 5 | 8 | 2.23 | A | AA | A | A |
| Comparative Example 1 | 3 | 2 | 0.23 | C | A | C | C |
| Comparative Example 2 | 5 | 7 | 0.90 | C | B | C | C |
| Comparative Example 3 | 5 | 9 | 2.58 | AA | C | A | C |
| Comparative Example 4 | 6 | 9 | 1.89 | A | C | B | C |
| Comparative Example 5 | 6 | 8 | 1.54 | A | C | B | C |

As given in Table 3, Examples 1 to 11 had an overall evaluation of B or higher and were favorable. Examples 2, 5, 7, 10, and 11, in which a−b>2, had an overall evaluation of A or higher and were more favorable. Examples 1, 4, and 8 had an overall evaluation of AA and were particularly favorable.

Meanwhile, Comparative Examples 1 and 2, in which a−b<1, had a wipeability evaluation of B or higher but a mixability evaluation and cleanability evaluation of C and were thus unfavorable. In Comparative Example 3, a−b>1 was met, but a solvent whose SP value is 25.0 $(MPa)^{(1/2)}$ or higher was not included at 70% by mass or more relative to a total mass of the solvents included in the solvent group B. Thus, the mixability evaluation and cleanability evaluation were A or higher, but the wipeability evaluation was C and unfavorable. Comparative Example 4 did not include a solvent whose SP value is 27.5 $(MPa)^{(1/2)}$ or higher at 30% by mass or more relative to a total mass of the solvents included in the solvent group A and did not include a solvent whose SP value is 25.0 $(MPa)^{(1/2)}$ or higher at 70% by mass or more relative to the total mass of the solvents included in the solvent group B. Thus, the mixability evaluation and cleanability evaluation were B or higher, but the wipeability evaluation was C and unfavorable. Comparative Example 5 did not include a solvent whose SP value is 27.5 $(MPa)^{(1/2)}$ or higher at 30% by mass or more relative to the total mass of the solvents included in the solvent group A. Thus, the mixability evaluation and cleanability evaluation were B or higher, but the wipeability evaluation was C and unfavorable.

Some or all of the above embodiments and Examples can also be described as, but are not limited to, the following appendix.

APPENDIX

Appendix 1

An ink set, including: a water-based ink; and a water-based maintenance fluid; wherein the water-based ink includes a colorant and a solvent group A, which includes of one or more types of solvents;

the solvent group A includes a solvent whose SP value is 27.5 $(MPa)^{(1/2)}$ or higher at 30% by mass or more relative to a total mass of the solvents included in the solvent group A;

the water-based maintenance fluid includes a solvent group B including one or more types of solvents;

the solvent group B includes a solvent whose SP value is 25.0 $(MPa)^{(1/2)}$ or higher at 70% by mass or more relative to a total mass of the solvents included in the solvent group B; and a numerical value calculated by formula (1) below is 1 or higher.

$$a-b \quad (1)$$

a: Mass-weighted average $(MPa)^{(1/2)}$ of SP values $(MPa)^{(1/2)}$ of solvents included in solvent group A b: Mass-weighted average $(MPa)^{(1/2)}$ of SP values $(MPa)^{(1/2)}$ of solvents included in solvent group B Appendix 2

The ink set of appendix 1, wherein the numerical value calculated by formula (1) is 2 or higher.

Appendix 3

The ink set of appendix 1, wherein the numerical value calculated by formula (1) is 3 or higher.

Appendix 4

The ink set of any among appendices 1 to 3, wherein the water-based ink includes polymer particles.

Appendix 5

The ink set of any among appendices 1 to 4, wherein the solvent group A includes a solvent whose SP value is 25.0 $(MPa)^{(1/2)}$ or higher at 70% by mass or more relative to the total mass of the solvents included in the solvent group A.

(Appendix 6)

The ink set of any among appendices 1 to 5, further including: a coagulant fluid; wherein
the coagulant fluid includes a coagulant that coagulates the colorant.

Appendix 7

The water-based maintenance fluid of any among appendices 1 to 6, wherein the water-based maintenance fluid is for cleaning the water-based ink of any among appendices 1 to 6.

Appendix 8

A cleaning method, including: a cleaning step of applying a water-based maintenance fluid to clean a body whereto a water-based ink is adhered; wherein
the water-based ink includes a colorant and a solvent group A, which includes one or more types of solvents;
the solvent group A includes a solvent whose SP value is 27.5 $(MPa)^{(1/2)}$ or higher at 30% by mass or more relative to a total mass of the solvents included in the solvent group A;
the water-based maintenance fluid includes a solvent group B including one or more types of solvents;
the solvent group B includes a solvent whose SP value is 25.0 $(MPa)^{(1/2)}$ or higher at 70% by mass or more relative to a total mass of the solvents included in the solvent group B; and
a numerical value calculated by formula (1) below is 1 or higher.

$$a-b \qquad (1)$$

a: Mass-weighted average $(MPa)^{(1/2)}$ of SP values $(MPa)^{(1/2)}$ of solvents included in solvent group A
b: Mass-weighted average $(MPa)^{(1/2)}$ of SP values $(MPa)^{(1/2)}$ of solvents included in solvent group B Appendix 9

The cleaning method of appendix 8, wherein the numerical value calculated by formula (1) is 2 or higher.

Appendix 10

The cleaning method of appendix 8, wherein the numerical value calculated by formula (1) is 3 or higher.

Appendix 11

The cleaning method of any among appendices 8 to 10, wherein the cleaning step is a step of using a wiper to wipe away a mixture of the water-based ink and the water-based maintenance fluid after the water-based maintenance fluid is applied.

Appendix 12

The cleaning method of any among appendices 8 to 11, wherein the cleaning step is a step of using a pump to suction a mixture of the water-based ink and the water-based maintenance fluid after the water-based maintenance fluid is applied.

Appendix 13

An image forming system, including: an ink channel; ink applying means; and cleaning means; wherein
the water-based ink of any among appendices 1 to 6, which is fed to the ink channel, is applied by the ink applying means to an object whereon an image is to be formed, and
the water-based ink adhered to the ink applying means is cleaned by the cleaning means, which includes the water-based maintenance fluid of any among appendices 1 to 6.

Appendix 14

An image forming method, including: an image forming step of using ink applying means to apply the water-based ink of any among appendices 1 to 6 to an object whereon an image is to be formed; and
a cleaning step of using the water-based maintenance fluid of any among appendices 1 to 6 to clean the water-based ink adhered to the ink applying means.

As above, the ink set, water-based maintenance fluid, cleaning method, image forming system, and image forming method of the present disclosure are optimal for cleaning a body whereto a water-based ink is adhered. The ink set, water-based maintenance fluid, cleaning method, image forming system, and image forming method of the present disclosure are widely applicable in forming an image on various objects whereon an image is to be formed.

Obviously, numerous modifications and variations of the present invention(s) are possible in light of the above teachings. It is therefore to be understood that within the scope of the appended claims, the invention(s) may be practiced otherwise than as specifically described herein.

What is claimed is:
1. An ink set, comprising:
a water-based ink; and
a water-based maintenance fluid,
wherein
the water-based ink comprises a colorant and at least one solvent whose SP value is 27.5 $(MPa)^{(1/2)}$ or higher in an amount of 30% by mass or more relative to a total mass of the solvents included in the water-based ink,
the water-based maintenance fluid comprises at least one solvent whose SP value is 25.0 $(MPa)^{(1/2)}$ or higher in an amount of 70% by mass or more relative to a total mass of the solvents included in the water-based maintenance fluid, and
a numerical value calculated by formula (1) is 1 or higher:

$$a-b \qquad (1),$$

wherein a is a mass-weighted average of SP values $(MPa)^{(1/2)}$ of solvents included in the water-based ink, and b is a mass-weighted average of SP values $(MPa)^{(1/2)}$ of solvents included in the water-based maintenance fluid.

2. The ink set of claim 1, wherein the numerical value calculated by formula (1) is 2 or higher.

3. The ink set of claim 1, wherein the numerical value calculated by formula (1) is 3 or higher.

4. The ink set of claim 1, wherein the water-based ink further comprises polymer particles.

5. The ink set of claim 1, wherein the water-based ink comprises a solvent whose SP value is 25.0 $(MPa)^{(1/2)}$ or higher in an amount of 70% by mass or more relative to the total mass of the solvents included in the water-based ink.

6. The ink set of claim 1, further comprising a coagulant fluid which comprises a coagulant that coagulates the colorant.

7. A water-based maintenance fluid comprising at least one solvent whose SP value is 25.0 $(MPa)^{(1/2)}$ or higher in an amount of 70% by mass or more relative to a total mass of the solvents included in the water-based maintenance fluid, wherein
 the water-based maintenance fluid is suitable for cleaning a water-based ink which comprises a colorant and at least one solvent whose SP value is 27.5 $(MPa)^{(1/2)}$ or higher in an amount of 30% by mass or more relative to a total mass of the solvents included in the water-based ink, wherein a numerical value calculated by formula (1) is 1 or higher:

$$a-b \qquad (1),$$

wherein a is a mass-weighted average of SP values $(MPa)^{(1/2)}$ of solvents included in the water-based ink and b is a mass-weighted average of SP values $(MPa)^{(1/2)}$ of solvents included in the water-based maintenance fluid.

8. A cleaning method comprising:
applying a water-based maintenance fluid to a body to which a water-based ink is adhered, wherein
the water-based ink comprises a colorant and at least one solvent whose SP value is 27.5 $(MPa)^{(1/2)}$ or higher in an amount of 30% by mass or more relative to a total mass of the solvents included in the water-based ink, and the water-based maintenance fluid comprises at least one solvent whose SP value is 25.0 $(MPa)^{(1/2)}$ or higher in an amount of 70% by mass or more relative to a total mass of the solvents included in the water-based maintenance fluid, and a numerical value calculated by formula (1) is 1 or higher:

$$a-b \qquad (1),$$

wherein a is a mass-weighted average of SP values $(MPa)^{(1/2)}$ of solvents included in the water-based ink and b is a mass-weighted average of SP values $(MPa)^{(1/2)}$ of solvents included in the water-based maintenance fluid.

9. The cleaning method of claim 8, wherein the numerical value calculated by formula (1) is 2 or higher.

10. The cleaning method of claim 8, wherein the numerical value calculated by formula (1) is 3 or higher.

11. The cleaning method of claim 8, further comprising wiping away a mixture of the water-based ink and the water-based maintenance fluid with a wiper, after the water-based maintenance fluid is applied.

12. The cleaning method of claim 8, further comprising a suctioning a mixture of the water-based ink and the water-based maintenance fluid with a pump, after the water-based maintenance fluid is applied.

13. An image forming system, comprising:
the ink set of claim 1;
an ink channel through which the water-based ink in the ink set passes;
an inkjet head connected to the ink channel and configured to apply the water-based ink of the ink set to an object on which an image is to be formed; and
a cleaner configured to apply the water-based maintenance fluid of the ink set to the inkjet head to clean the inkjet head.

14. The image forming system of claim 13, wherein the cleaner comprises: an applicator configured to apply the water-based maintenance fluid to the inkjet head; and an ink remover configured to remove ink adhered to the inkjet head.

15. An image forming method, comprising:
performing the cleaning method of claim 8; and
applying the water-based ink to an object on which an image is to be formed to form an image on the object, before performing the cleaning method.

\* \* \* \* \*